Figure 1:
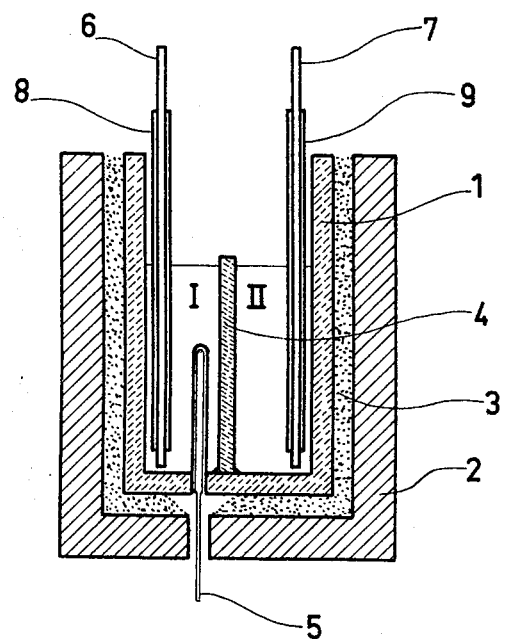

United States Patent [19]

Gatellier et al.

[11] 3,944,476

[45] Mar. 16, 1976

[54] PROCESS FOR DESULFURIZING MOLTEN METALS

[75] Inventors: Christian Gatellier, Montigny-les-Metz; Michel Olette, Moulins-les-Metz, both of France

[73] Assignee: Institut de Recherches de la Siderurgie Francaise, Saint-Germain-en-Laye, France

[22] Filed: May 20, 1974

[21] Appl. No.: 471,730

[30] Foreign Application Priority Data

May 21, 1973 France .............................. 73.18328

[52] U.S. Cl. ............................... 204/140; 204/195 S
[51] Int. Cl.² .......................................... C25F 1/00
[58] Field of Search ......... 204/140, 195 S; 136/86 F

[56] References Cited
UNITED STATES PATENTS

| | | | |
|---|---|---|---|
| 800,984 | 10/1905 | Chance | 204/140 |
| 3,400,054 | 9/1968 | Ruka et al. | 204/195 S |
| 3,619,381 | 11/1971 | Fitterer | 204/195 S |

Primary Examiner—T. M. Tufariello
Attorney, Agent, or Firm—Michael J. Striker

[57] ABSTRACT

Process for decreasing the sulfur content of liquid metal using high temperature comprising passing a direct current by means of two electrodes through a solid electrolyte constituting a refractory wall of oxide having anionic conductivity through the oxygen ($O^{--}$) ions and also cationic conductivity through ions which are capable of reacting with the sulfur, wherein the metal to be purified forms the negative electrode. The process is particularly adapted to desulfurizing iron and ferrous alloys when present in the liquid state.

9 Claims, 3 Drawing Figures

FIG_1_

PROCESS FOR DESULFURIZING MOLTEN METALS

The present invention relates to the desulfurization of liquid metals using high temperatures. More particularly this invention relates to a method for decreasing the sulfur content of metals capable of being molten utilizing an electrolytic procedure.

The known techniques for producing metals from ores containing the same include at least one refining step which is intended to eliminate the impurities present in the raw metal which impurities consist of both metals and metalloids. Certain of these generally present impurities, even when present in small amounts are capable of profoundly affecting the mechanical properties and characteristics of the metal or alloys sought to be prepared. For instance, in the case of steel working, sulfur constitutes a particularly harmful impurity, the presence of which gives rise to a deterioration in a large number of the properties of the metal, among which there may be mentioned forgeability, weldability and resilience. Therefore, attempts are made in the course of the preparation of the steel to limit the inclusion therein of extraneous sulfur and additionally to decrease, by appropriate treatment, the sulfur which is already unavoidably present in the metal. The treatment as is presently employed generally consists in the fixing of the sulfur in the form of insoluble sulfides which are then eliminated by careful treatment of the slag which is formed. This is generally accomplished by introducing into the melt desulfurizing agents. The desulfurizing agents in the main are selected from the group consisting of carbonates of sodium or calcium, calcium carbide and more complex mixtures containing any of the foregoing, as basic constituents. However, in spite of the affinity of sulfur for these additives, it is only possible to obtain adequate desulfurization by insuring their proper dispersion in the metal bath. This requires for instance the blowing in of the agents in the form of their powders suspended in a gaseous vehicle. Such techniques almost always give rise to the formation of a more or less fluid dross or slag and are associated with the known drawbacks arising from the presence of such dross or slag, such as the loss of metal in the subsequent cleansing, risk of incorporating components of the slag in the metal, fouling of the apparatus and the like.

It is an object of the present invention to provide a process allowing for the effective desulfurization of molten metals not associated with the disadvantages of the heretofore practiced procedures.

It is another object of the invention to provide a process for desulfurizing metals avoiding the need to incorporate into the metal melt any scorifying agents.

Yet another object of the invention is a simple and economically feasible method for decreasing the sulfur content of metals, liquid at high temperature.

Figure 2:
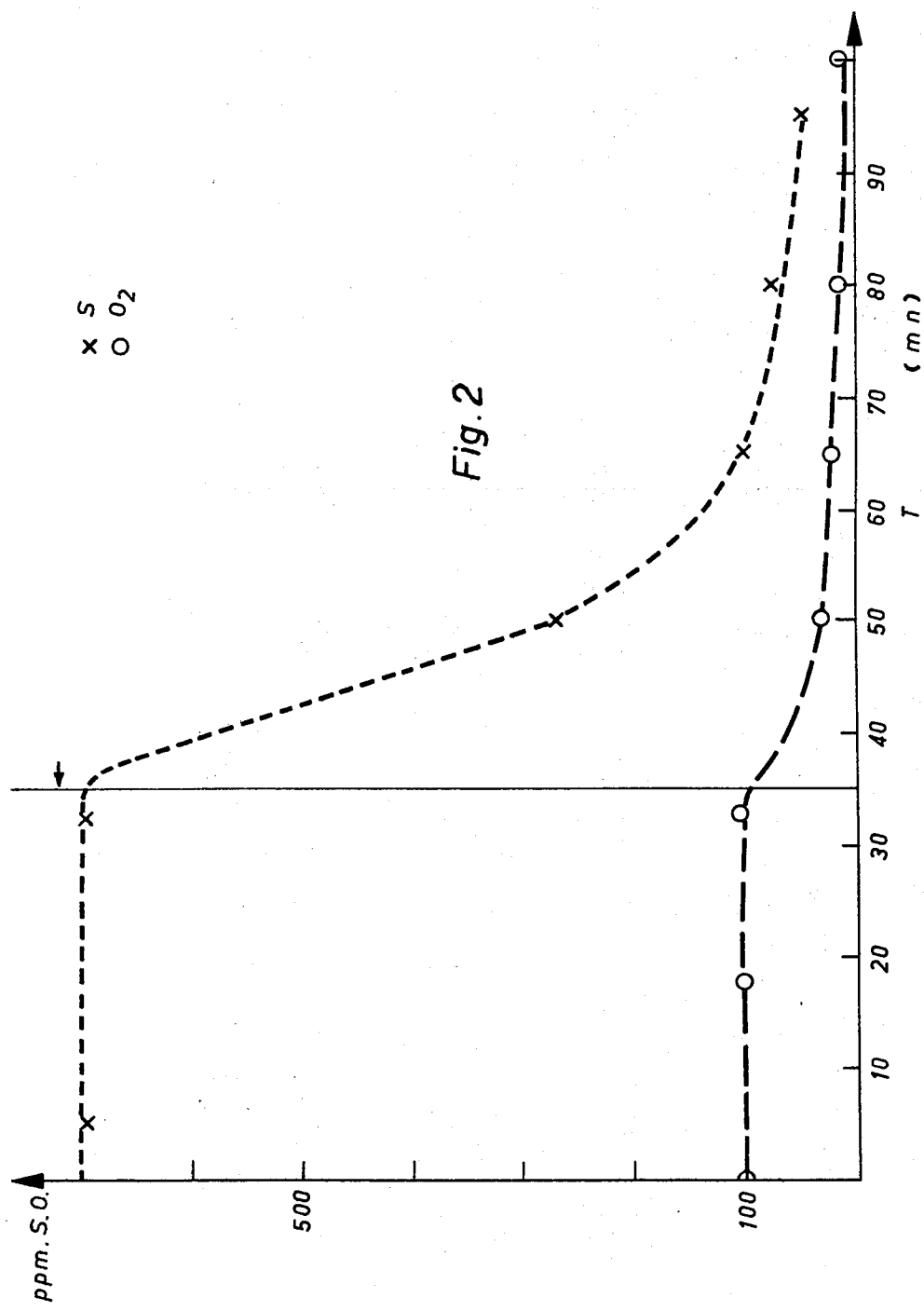
Figure 3:
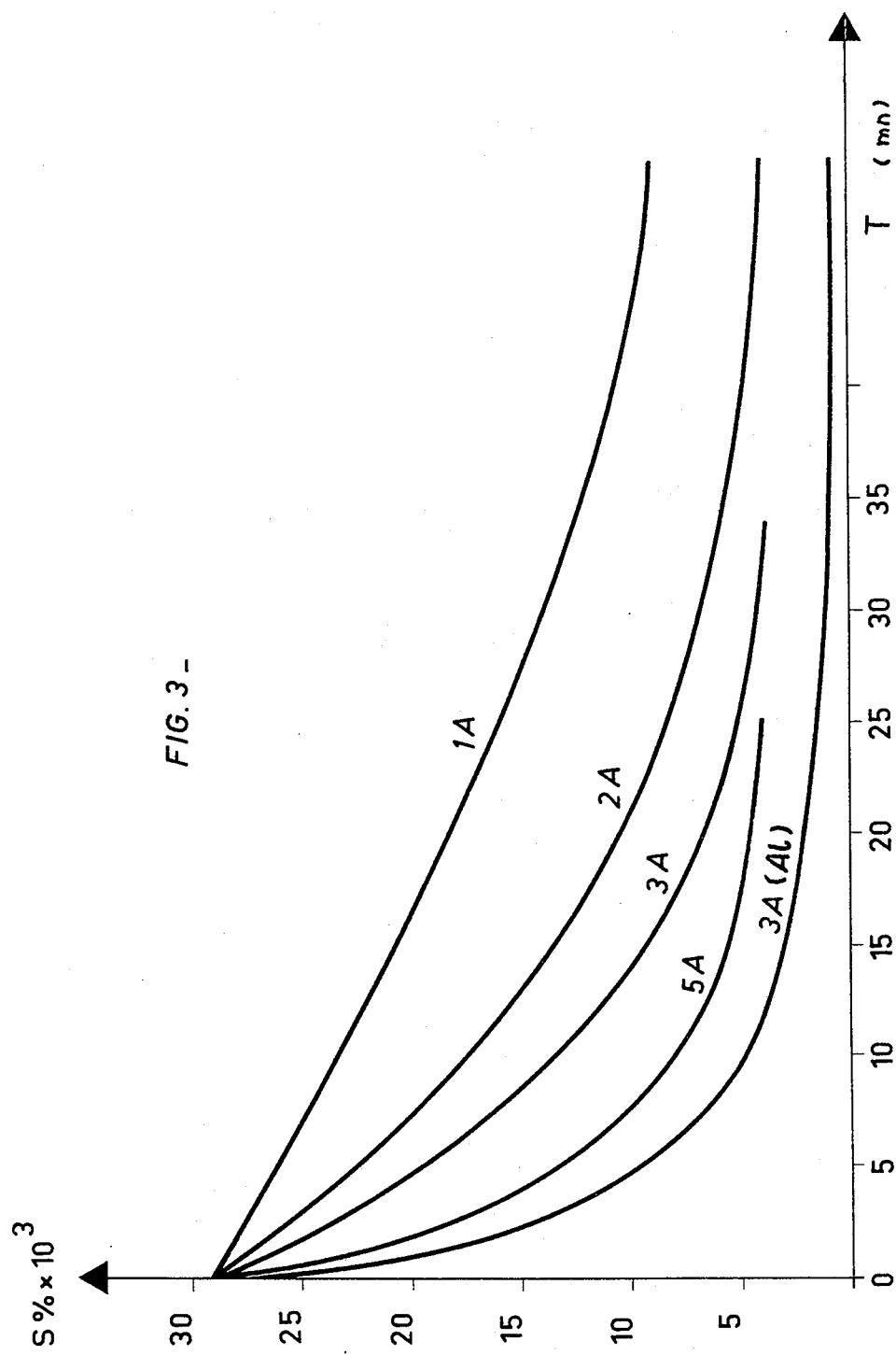

These and other objects and advantages of the invention will become apparent from a consideration of the following disclosure and drawings in which FIG. 1 depicts the apparatus used for carrying out the desulfurization in accordance with the invention;

FIG. 2 depicts graphically the content of sulfur and oxygen of a liquid iron bath, desulfurized utilizing a cell having a lime solid electrolyte wall; and FIG. 3 depicts graphically the levels of the sulfur content as a function of time under different conditions.

In accordance with the invention it has now been found that the sulfur content of metals that are liquid at high temperatures, can be decreased by passing a direct current utilizing two electrodes, through a wall of refractory oxide which has anionic conductivity through the oxygen ($O^{--}$) ions and cationic conductivity through ions that are capable of reacting with the sulfur, the said wall of refractory oxide containing a fluoride of an alkali or alkaline earth metal, wherein the metal being desulfurized forms the negative electrode of the electrochemical cell which is thusly formed. According to one preferred embodiment of the invention, conductivity is ensured by inclusion of calcium or magnesium ions. The wall of refractory oxide in this instance contains materials such as lime, magnesia or calcined dolomite associated with calcium fluoride.

As will be appreciated, the method in accordance with the invention is based on the use of solid electrolytes for fixing the sulfur present in the liquid metal. A large number of solid electrolytes are known which are specifically composed and adjusted with view toward their use in measuring the activity of oxygen present in gases and in liquid metals. The best known of this class of solid electrolytes and the one which has been most actively investigated and evaluated is zirconia doped with lime. Such electrolyte, in particular, the latter zirconia electrolytes, are possessed of conductivity through oxygen ions. This property has been used to form the so-called oxygen batteries which through measurement of the potential make it possible to determine the activity of the oxygen gas dissolved in molten metals. Moreover, this same property has been used for eliminating the oxygen from molten metal baths, in particular from tin and copper baths.

In order to obtain this result, a current is passed through the battery formed by the metal constituting one electrode, the solid electrolyte and the second electrode. The oxygen present in the metal is thereby passed through the wall of solid electrolyte and is eliminated at the other electrode by gas scavenging.

It has quite recently been found that certain of the solid electrolytes display conductivity not only through the oxygen ions present therein but also cationic conductivity. The applicants on the basis of the latter finding have concluded that a solid electrolyte, having conductivity through its oxygen ions and also cationic conductivity, should under certain conditions be suitable for the desulfurization of molten metal. The work undertaken by the applicants has established that this desulfurization is not only possible but further the use of such electrolytes permits the obtaining of unexpectedly high degrees of elimination of sulfur and that, to the extent, that the cationic conductivity is ensured by the presence of cations capable of reacting with the sulfur. Thus the lime or calcined dolomite refractory walls in which cationic conductivity is supplied by the presence therein of calcium ions have proved highly efficient for decreasing the sulfur contents of metal. In the case where the desulfurization of cast iron is sought to be effected, magnesia walls, the active ions being magnesium ions, are also suitable for use. Indeed, when a current is passed through a solid wall of electrolyte prepared on the basis of these materials, the metal forming the negative electrode, a simultaneous double mechanism is brought about. On the one hand, the elimination of the oxygen which in the process passes through the wall of the solid electrolyte, and on the other hand, the reaction of sulfur with the calcium ions which owing to their cationic conductivity are brought to the metal-electrolyte interface, which is solid and deprived of oxygen ions, are brought about. Thereby the sulfur is fixed in the electrolyte wall of solid material and is accordingly eliminated from the bath.

The advantages of the process of the invention and its simplicity as well will be seen clearly from the following Examples in which the process is described by reference to the drawings.

EXAMPLE 1

The process is carried out in a double-walled (1 and 2) refractory crucible, the walls being separated by an insulation of refractory grains 3 in order to improve the heat retention. The crucible is separated into two compartments I and II by a wall of solid electrolyte 4 characterized by anionic and cationic conductivity as has been described above. The crucible has heating means not shown in the drawing but which are well-known and which serve for keeping the iron at a temperature in the order of 1600°C. A thermocouple 5 makes it possible to check that the temperature is maintained as required. In each compartment, an electrical conductor is placed consisting of an iron rod 6 and 7 encased in an aluminum sheath 8 and 9. These electrodes are connected respectively to a source of direct current whose intensity is stabilized in the conventional manner. The connection is made in such a manner that the metal being desulfurized constitutes the negative pole of the cell thus formed. Utilizing this apparatus, the applicants herein evaluated a number of walls and specifically walls made of lime containing calcium fluoride (about 4% by weight), one on the basis of calcined dolomite also containing calcium fluoride and a third constituted of magnesia which is also associated with calcium fluoride. The results were essentially the same so that only those results obtained in the case of the lime wall with calcium fluoride need be reported.

In order to evaluate the effectiveness of the cell and specifically the process of the invention, tests were carried out by placing in compartments I and II a mass of liquid iron not containing any sulfur. In a second step there was placed in the cathode compartment a known quantity of sulfur and a determination of the quantity of sulfur and oxygen present was carried out before the cell was activated.

By reference to FIG. 2 it will be seen that after 35 minutes of stabilization, the sulfur and oxygen contents of the metal being purified were respectively 690 ppm and 106 ppm. After 35 minutes of stabilization, in a second step a 3-ampere direct current was passed through the cell and the content of sulfur and oxygen determined by successively carried out determinations. An examination of FIG. 2 wherein the abscissa there is shown the time and on the ordinate the contents of sulfur and oxygen establishes that in the absence of the passage of current, the quantities of sulfur and oxygen remain stable and then decrease as the current is passed through the cell. This decrease is considerable as regards the sulfur content which in an hour fell from 690 to 48 ppm representing the elimination of 93% of the sulfur originally present. Parallel to this it is noted that the quantity of oxygen fell from 106 to 13 ppm.

EXAMPLE 2

In a second set of tests, the lime wall was replaced by a calcined dolomite wall associated with calcium fluoride (the composition of the calcined dolomite corresponds to approximately MgO=40%, CaO=60%). The other operating conditions were kept the same, 610 ppm of sulfur were then placed in the liquid iron melt. The evaluation of the sulfur content shows the following:

| 5 minutes  | 450 ppm |
| 10 minutes | 270 ppm |
| 15 minutes | 170 ppm |
| 20 minutes | 90 ppm  |
| 30 minutes | 40 ppm  |
| 40 minutes | 20 ppm  |

In FIG. 3, the above decrease has been shown as a function of the iron sulfide content for different current strengths. It can be seen that for an intensity of current of 5-amperes, the initial sulfur content which was 0.03%, dropped below 0.005% after 30 minutes which is to be considered a remarkable result. It will also be seen that with a current strength of 3-amperes combined with a very small addition of aluminum, 0.05%, it is made possible to decrease the sulfur content down to the order of 0.001% in 30 minutes.

These results which show a particularly high desulfurization establish the importance of the method of the invention and confirm that sulfur can be eliminated from molten metal without resorting to the formation of slag.

Examination carried out using X-ray diffraction techniques conducted on the surface of the solid electrolyte exposed to the sulfurated metal established that the sulfur remains fixed in the form of calcium sulfide in the solid electrolyte.

The efficiency of the desulfurization of the invention which is obtained without having to resort to the use of a very highly divided state of material, is accounted for by the fact that through the action of the current, there is a continuous contribution of ions reacting with the surface on the interface of the metal to be purified and the refractory wall. It should be noted that in the tests carried out, liquid metal was placed on either side of the refractory wall so as to be able to carry out check determinations on both sides of the wall. In practice, however, the presence of metal on both sides of the wall is not necessary and the passage of current can be carried out equally well by applying an electric conductor directly against the surface of the wall opposite the metal to be purified. Indeed, owing to the conductivity properties of the materials used to form the walls, the metal/refractory oxide contact suffices to ensure the passage of current at the temperatures in question.

It is obvious that the process of the invention can be used without encountering any difficulty for desulfurizing liquid metal other than iron and ferrous alloys, for example, copper and tin.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A process for decreasing the sulfur content of a metal that is liquid at a high temperature which comprises passing a direct electric current between two electrodes, one of which consists of a solid refractory metal oxide having an anionic conductivity through oxygen ($O^{--}$) ions that are present therein and cationic activity through the presence of cations that are present therein which are capable of reacting with sulfur, the said electrode of the refractory metal oxide containing a fluoride of an alkali metal or alkaline-earth metal, in which process the metal to be desulfurized forms the negative electrode of the electrochemical cell that is thus produced.

2. Process according to claim 1 wherein said refractory oxide is lime.

3. Process according to claim 1 wherein said refractory oxide is magnesia.

4. Process according to claim 1 wherein said refractory oxide is a mixture of calcium oxide and magnesium oxide.

5. Process according to claim 1 wherein said liquid metal is an iron or iron-containing alloy.

6. Process according to claim 1 wherein said liquid metal is tin or copper.

7. Process according to claim 1 wherein said process is conducted at a temperature of about 1600°C.

8. A process for decreasing the sulfur content of a metal that is liquid at a high temperature as defined in claim 1 which comprises maintaining the metal that is to be desulfurized in a molten state in a refractory crucible comprising at least two compartments that are separated from each other by an electroconductive wall that is formed of a solid electrolyte comprising a fluoride of an alkali metal or alkaline-earth metal together with calcium oxide or magnesium oxide or a mixture of both which serves as the positive electrode, and passing a direct electric current between the molten metal and the electroconductive wall for a period sufficient to produce a reduction of the sulfur content of the metal.

9. A process as defined in claim 8 in which calcium fluoride is the fluoride of the alkaline-earth metal in the electrolyte.

* * * * *